US009226292B2

(12) United States Patent
Thubert et al.

(10) Patent No.: US 9,226,292 B2
(45) Date of Patent: *Dec. 29, 2015

(54) RESILIENT FORWARDING OF PACKETS IN AN ARC CHAIN TOPOLOGY NETWORK

(71) Applicants: Pascal Thubert, La Colle sur Loup (FR); Norman William Finn, Livermore, CA (US); Jean-Philippe Vasseur, Saint Martin d'Uriage (FR); Patrick Wetterwald, Mouans Sartoux (FR)

(72) Inventors: Pascal Thubert, La Colle sur Loup (FR); Norman William Finn, Livermore, CA (US); Jean-Philippe Vasseur, Saint Martin d'Uriage (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 14/020,932

(22) Filed: Sep. 9, 2013

(65) Prior Publication Data

US 2015/0023327 A1    Jan. 22, 2015

Related U.S. Application Data

(60) Provisional application No. 61/847,454, filed on Jul. 17, 2013, provisional application No. 61/847,661, filed on Jul. 18, 2013.

(51) Int. Cl.
*H04J 3/00*      (2006.01)
*H04W 72/04*  (2009.01)
(Continued)

(52) U.S. Cl.
CPC ......... *H04W 72/0446* (2013.01); *H04J 3/1694* (2013.01); *H04L 45/32* (2013.01); *H04W 40/023* (2013.01)

(58) Field of Classification Search
CPC ....... H04J 3/1694; H04L 45/04; H04L 45/16; H04L 45/24; H04L 45/32; H04L 45/14; H04L 45/18; H04W 40/023; H04W 72/0446
See application file for complete search history.

(56) References Cited

U.S. PATENT DOCUMENTS 5,719,853 A * 2/1998 Ikeda .................. H04L 12/5602
                                                                370/229
7,633,940 B1 * 12/2009 Singh ...................... H04L 45/12
                                                                370/237

(Continued)

FOREIGN PATENT DOCUMENTS

WO        2014/058936 A1      4/2014

OTHER PUBLICATIONS

Awduche et al., "RSVP-TE: Extensions to RSVP for LSP Tunnels," RFC 3209, Dec. 2001, The Internet Society, Reston, VA (sixty-one pages).

(Continued)

*Primary Examiner* — Asad Nawaz
*Assistant Examiner* — Berhanu Belete
(74) *Attorney, Agent, or Firm* — The Law Office of Kirk D. Williams

(57) ABSTRACT

One embodiment includes: forwarding a particular packet through an Available Routing Construct (ARC) chain topology network. In one embodiment, this forwarding includes: sending the particular packet by each particular non-edge node on an arc of the plurality of arcs receiving the particular packet to each sibling on the arc that did not send the particular packet to said particular non-edge node, while not sending the particular packet if it was received from both siblings of said particular edge node; and sending the particular packet to a respective child node on a second arc of the plurality of arcs by each particular edge node of two edge nodes on the arc after receiving the particular packet. In one embodiment, the network is a wireless deterministic network with pre-assigned time slots for receiving and subsequently sending a same particular packet by each node of the network.

20 Claims, 13 Drawing Sheets

(51) Int. Cl.
*H04J 3/16* (2006.01)
*H04L 12/721* (2013.01)
*H04W 40/02* (2009.01)

(56) References Cited

U.S. PATENT DOCUMENTS

| | | | | |
|---|---|---|---|---|
| 7,792,118 | B2* | 9/2010 | Chao | H04L 49/1523 370/386 |
| 8,139,581 | B1* | 3/2012 | Mraz | H04L 63/105 370/392 |
| 8,363,662 | B2 | 1/2013 | Thubert et al. | |
| 8,447,849 | B2* | 5/2013 | Shaffer | H04L 47/726 709/223 |
| 8,451,744 | B2* | 5/2013 | Vasseur | H04L 45/04 370/235 |
| 8,489,765 | B2* | 7/2013 | Vasseur | 709/238 |
| 8,565,235 | B2* | 10/2013 | Bannai | H04L 12/42 370/392 |
| 8,630,167 | B2* | 1/2014 | Ashwood Smith | H04L 45/00 370/217 |
| 8,630,177 | B2 | 1/2014 | Vasseur et al. | |
| 8,817,665 | B2 | 8/2014 | Thubert et al. | |
| 8,855,022 | B2* | 10/2014 | Jain | H04L 45/24 370/228 |
| 2002/0176371 | A1* | 11/2002 | Behzadi | H04L 45/02 370/254 |
| 2003/0046426 | A1* | 3/2003 | Nguyen | H04L 41/0681 709/242 |
| 2008/0130489 | A1* | 6/2008 | Chao | H04L 45/00 370/219 |
| 2008/0222478 | A1* | 9/2008 | Tamaki | H04L 1/18 714/749 |
| 2009/0074413 | A1* | 3/2009 | Bannai | H04L 12/42 398/59 |
| 2011/0110241 | A1* | 5/2011 | Atkinson | H04L 43/0811 370/242 |
| 2012/0155329 | A1* | 6/2012 | Shaffer | H04L 45/023 370/255 |
| 2012/0300668 | A1* | 11/2012 | Thubert | H04L 45/18 370/254 |
| 2014/0006893 | A1 | 1/2014 | Shetty et al. | |
| 2014/0098711 | A1 | 4/2014 | Thubert et al. | |
| 2014/0233422 | A1 | 8/2014 | Thubert et al. | |

OTHER PUBLICATIONS

Winter et al., "RPL: IPv6 Routing Protocol for Low-Power and Lossy Networks," RFC 6550, Mar. 2012, The Internet Society, Reston, VA, USA (157 pages).
Goyal et al., "Reactive Discovery of Point-to-Point Routes in Low-Power and Lossy Networks," RFC 6997, Aug. 2013, The Internet Society, Reston, VA, USA (forty pages).
Thubert et al, "Available Routing Constructs," draft-thubert-rtgwg-arc-00, Oct. 2, 2012, The Internet Society, Reston, VA, USA (nineteen pages).
Thubert et al, "Applying Available Routing Constructs to bicasting," draft-thubert-rtgwg-arc-bicast-00, Oct. 11, 2012, The Internet Society, Reston, VA, USA (ten pages).
"Media Access Control (MAC) Bridges and Virtual Bridge Local Area Networks," IEEE Std 802.1Q™—2011, Aug. 31, 2011, IEEE Computer Society, IEEE, New York, NY (one thousand three hundred sixty-five pages).
Braden et al., "Resource ReSerVation Protocol (RSVP)—Version 1 Functional Specification," RFC 2205, Sep. 1997, The Internet Society, Reston, VA, USA (112 pages).
Le Faucheur, Resource Reservation Protocol (RSVP) Extensions for Path-Triggered RSVP Receiver Proxy, RFC 5946, Oct. 2010, The Internet Society, Reston, VA, USA (thirty-five pages).
"Part 15.4: Low-Rate Wireless Personal Area Networks (LR-WPANs) Amendment 1: MAC sublayer," IEEE Std 802.15.4e™—2012, Apr. 16, 2012, IEEE Computer Society, IEEE, New York, NY (two hundred twenty-five pages).
Vasseur et al., "Path Computation Element (PCE) Communication Protocol (PCEP)," RFC 5440, Mar. 2009, The Internet Society, Reston, VA, USA (eighty-seven pages).
Wang et al., "6tus Layer Specification," draft-wang-6tsch-6tus-01, May 23, 2013, The Internet Society, Reston, VA, USA (fifty-six pages).
Yasukawa et al., "Operations and Management (OAM) Requirements for Point-to-Multipoint MPLS Networks," RFC 4687, Sep. 2006, The Internet Society, Reston, VA, USA (fourteen pages).
Bocci et al., "A Framework for MPLS in Transport Networks," RFC 5921, Jul. 2010, The Internet Society, Reston, VA, USA (fifty-six pages).
Atlas et al., "An Architecture for IP/LDP Fast-Reroute Using Maximally Redundant Trees," draft-ietf-rtgwg-mrt-frr-architecture-03, Jul. 12, 2013, The Internet Society, Reston, VA, USA (twenty-nine pages).
Ripphausen-Lipa et al., "The Vertex-Disjoint Menger Problem in Planar Graphs," SODA '93 Proceedings of the Fourth Annual ACM-SIAM Symposium on Discrete Algorithms, Society for Industrial and Applied Mathematics, Philadelphia, PA, 1993 (eight pages).
Thubert et al., "IETF 6TSCH: Combining IPv6 Connectivity with Industrial Performance," 2013 Seventh International Conference on Innovative Mobile and Internet Services in Ubiquitous Computing (IMIS), IEEE, New York, NY, Jul. 2013 (six pages).
"Deterministic Ethernet, IEEE 802.1 standards for real-time process control, industrial automation, and vehicular networks," available at http://www.ieee802.org/802_tutorials/2012-11/8021-tutorial-final-v4.pdf, Nov. 12, 2012, IEEE, New York, NY (seventy-two pages).
Watteyne et al., "Using IEEE802.15.4e TSCH in an LLN context: Overview, Problem Statement and Goals," draft-watteyne-6tsch-tsch-lln-context-02, May 23, 2013, The Internet Society, Reston, VA (twenty-three pages).
Farrel et al., "A Path Computation Element (PCE)-Based Architecture," RFC 4655, The Internet Society, Reston, VA (forty pages).
PCT International Search Report and Written Opinion, PCT Application PCT/US2014/044462, ISA/EP, European Patent Office, Netherlands, mailed Nov. 4, 2014 (ten pages).
Thubert et al., "Applying Available Routing Constructs to bicasting," draft-thubert-rtgwg-arc-bicast-00, Oct. 11, 2012, The Internet Society, Reston, VA, USA (ten pages).

* cited by examiner

RESILIENT FORWARDING OF PACKETS IN AN ARC CHAIN TOPOLOGY NETWORK

CROSS-REFERENCE TO RELATED APPLICATIONS

This application claims the benefit of U.S. Provisional Application No. 61/847,454, filed Jul. 17, 2013, and claims the benefit of U.S. Provisional Application No. 61/847,661, filed Jul. 18, 2013, both of which are hereby incorporated by reference in their entirety.

TECHNICAL FIELD

The present disclosure relates generally to forwarding packets in a communications network, including, but not limited to, a wireless deterministic network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Deterministic networks rely on a set of predetermined time slots, which define at least a time (and possibly frequency to use especially in a wireless deterministic network), when each specific node can communicate a packet to a second specific node in the deterministic network.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1A:
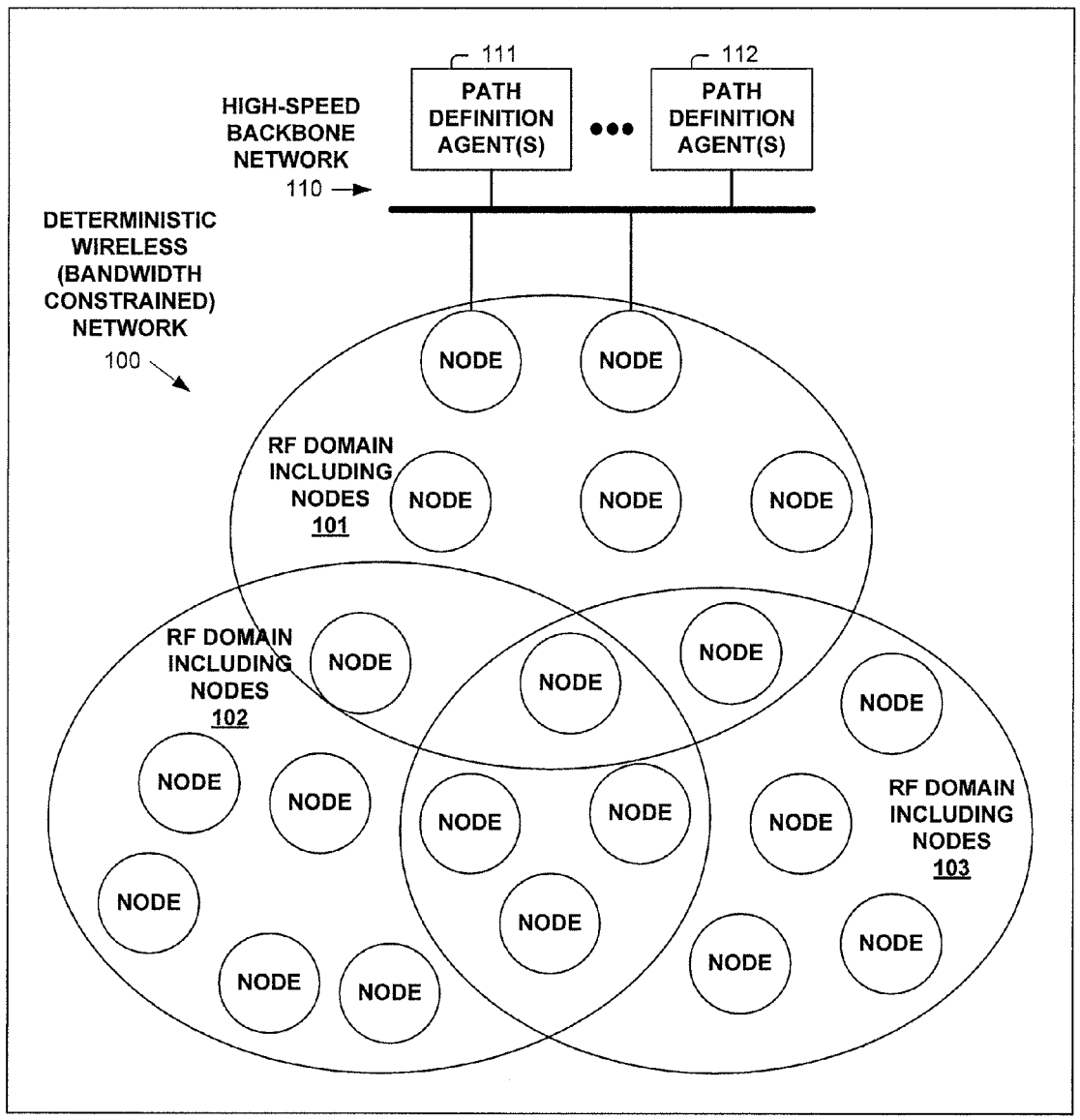
FIG. 1A illustrates a network operating according to one embodiment.

Disclosed are, inter alia, methods, apparatus, computer-storage media, mechanisms, and means associated with networks of nodes configured to communicate according to a configuration of Available Routing Construct (ARC) chains. More particularly, one embodiment provisions time slot communication in a network according to the ARC chains, communicates packets in a network according to the ARC chains, monitors communication in the network, and/or selectively controls whether or not provisioned particular links will be used over which to communicate packets. One embodiment includes: forwarding a particular packet through an Available Routing Construct (ARC) chain topology network including a plurality of arcs towards a destination node.

In one embodiment, said forwarding includes: sending the particular packet by each particular non-edge node on an arc of the plurality of arcs receiving the particular packet to each sibling on the arc that did not send the particular packet to said particular non-edge node, while not sending the particular packet if it was received from both siblings of said particular edge node; and sending the particular packet to a respective child node on a second arc of the plurality of arcs by each particular edge node of two edge nodes on the arc after receiving the particular packet.

In one embodiment, the network is a wireless deterministic network with pre-assigned time slots for receiving and subsequently sending a same particular packet by each node of the network.

2. Description

Disclosed are, inter alia, methods, apparatus, computer-storage media, mechanisms, and means associated with networks of nodes configured to communicate according to a configuration of ARC chains. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

As used herein, a "time slot" refers an elementary communications entity including a period of time for sending or receiving information (e.g., a packet). In the context of a wireless network, a time slot is also typically associated with a frequency, as the information is not only transmitted within a time slot, but also at a frequency (e.g., channel).

Expressly, turning to the figures, FIG. 1 illustrates a network 100 (e.g., deterministic wireless network, which is bandwidth constrained) operating according to one embodiment. As shown, network 100 includes a high-speed (e.g., Ethernet) backbone network including one or more path definition agents 111-112. Deterministic wireless network 100 includes three overlapping different radio frequency (RF) domains 101, 102 and 103, each containing a plurality of nodes as shown in FIG. 1A. Note, typically and not shown, each of these network nodes (e.g., when a node operates as a bridge or router) is connected to a network of devices and/or directly connected to one or more devices. One embodiment uses more or less RF domains and/or nodes.

Figure 1B:
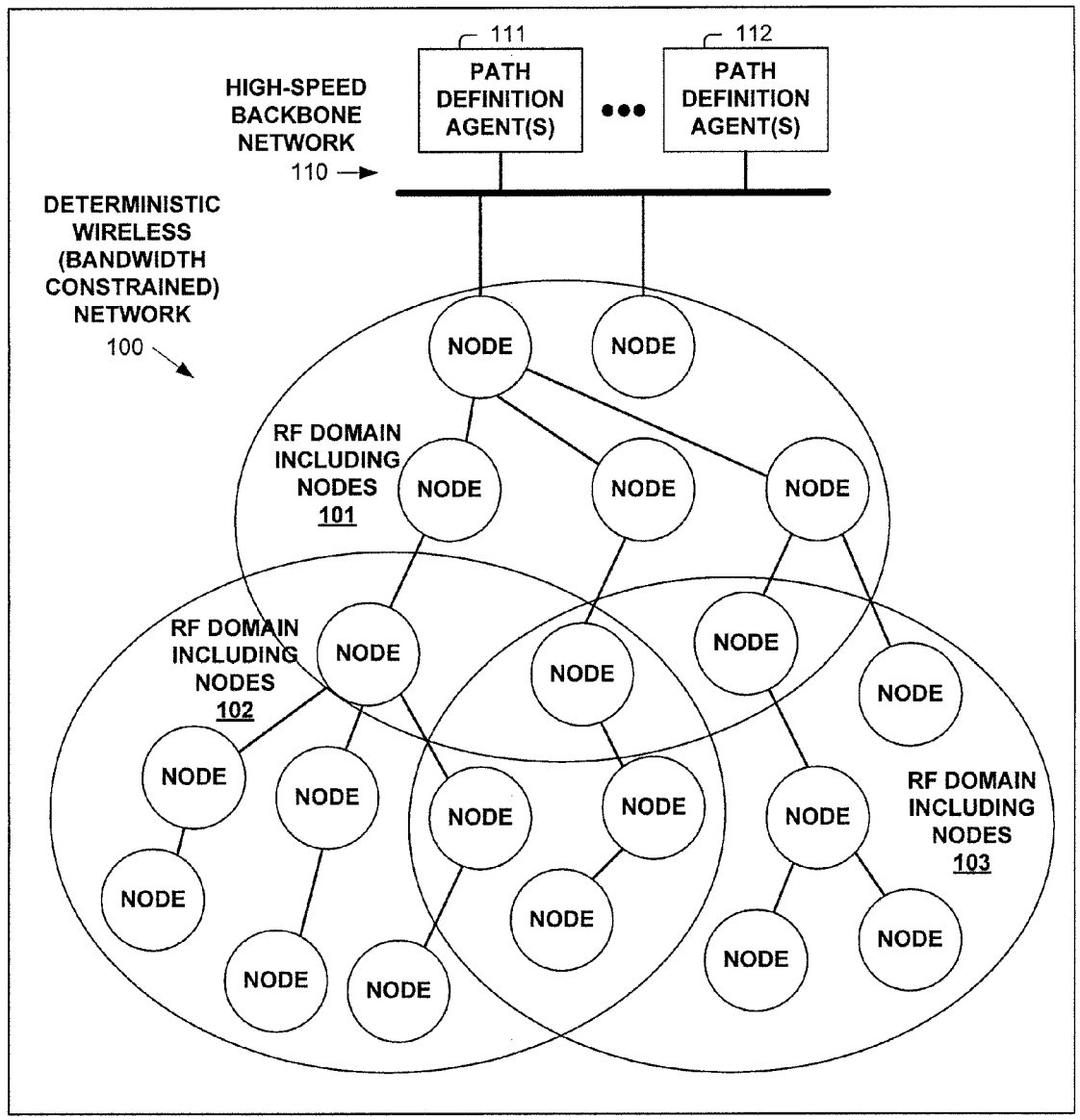
FIG. 1B illustrates a network operating according to one embodiment.

FIG. 1B illustrates the communication links established between nodes in RF domains 101, 102 and 103 to provide access to one or more path definition agents 111-112. In one embodiment, a communications path for transmitting packets between first and second nodes may traverse any set of nodes, and is not limited to one or more of the paths shown in FIG. 1B.

Figure 1C:
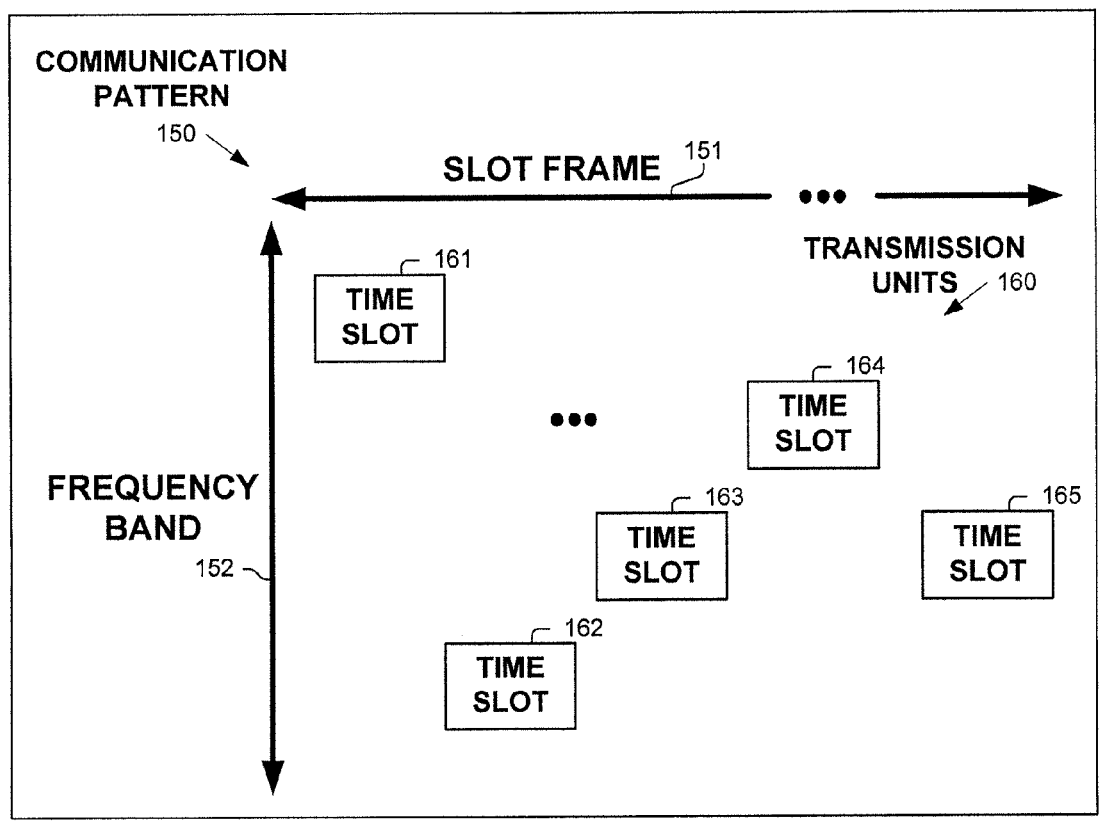
FIG. 1C illustrates a communication pattern operating according to one embodiment.

FIG. 1C illustrates a communication pattern 150 according to one embodiment of a deterministic network. Communication pattern 150 includes time slots 161-165, each of which provide a predetermined time for a sender to transmit a packet and for a receive to listen to receive the transmitted packet. A slot frame 151 (e.g., a Superframe when repeated typically with channel rotation) is a period of time divided into multiple time slots. Also, in a wireless (or fiber) a second dimension of frequency (152) of frequency band 152 is associated with each time slot 161-165. In one embodiment, a Superframe 151 is established by one or more path definition agents that defines a matrix of n time slots by m frequencies (e.g., channels). One or more of these n-m paring is referred to herein as a time slot as multiple time slots might be used to send a packet (e.g., to have a predetermined retransmission time for the packet if required).

Figure 2A:
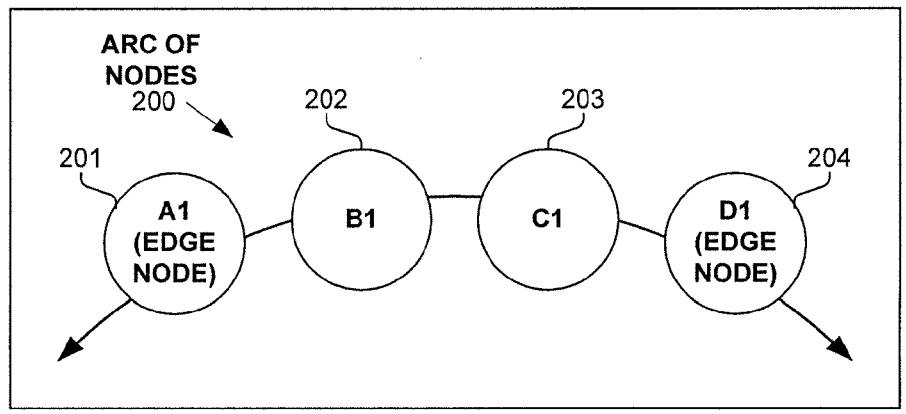
FIG. 2A illustrates an arc of nodes according to one embodiment.
Figure 2B:
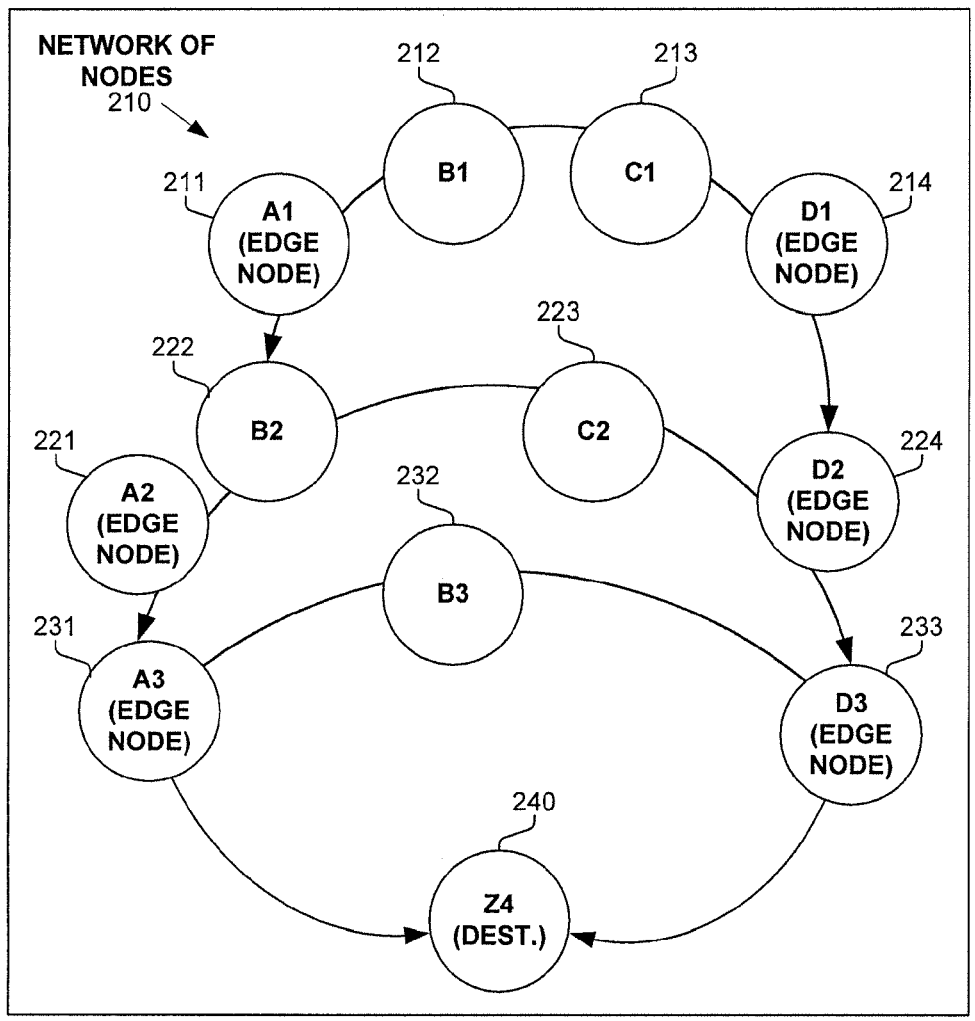
FIG. 2B illustrates a network of arcs of nodes according to one embodiment.

With reference to FIGS. 2A and 2B, ARC chains enable reliable segment routing by plugging arcs into the next segment along a path that is to be protected. A schedule is established that will leverage the resiliency in a deterministic fashion. This schedule can typically be guaranteed despite multiple losses, and typically has no single point of failure. An ARC chain typically follows closely the shortest path. Therefore, one embodiment establishes a schedule that leverages the ARC chain with limited additional latency and limited wasted forwarding equivalency class (FEC) bandwidth.

In one embodiment, an ARC chain is constructed along a path to be protected, with each segment interconnected at least twice with the next segment. A scheduled frame or packet is associated with a number of receive and transmit slots at any given node. A frame will be copied multiple times along each ARC, at least once in each direction in one embodiment, (and more in one embodiment such as in the case of there being a loss in one direction). The packet will typically also exit the ARC from both ends once all the receive slots are complete.

Referring specifically to FIG. 2A, illustrated is an ARC of nodes 200. ARC 200 includes four nodes 201-204, with nodes 201 and 204 often referred to as edge nodes as they are the last node of an ARC, and typically are coupled to another ARC chain (e.g., as shown in FIG. 2B). Each of nodes 201-204 will ensure (assuming no network failure) that each other node 201-204 has a copy of a packet by sending the packet in each direction from itself, typically unless the node has already received a copy of the packet from an adjacent node so as not to flood the network with copies of the packet. For example, if node B1 202 is the originator of a packet, it will send a copy to node A1 201 and to node C1 203. Node C1 203 having received a copy from node B1 202, only sends a copy to D1 204. Edge nodes 201 and 204 will send a copy to a next ARC. In one embodiment, edge nodes 201 and 204 wait until a last time that they could receive a copy of the packet before sending it to a child node in a next arc.

ARC chains enable reliable segment routing by plugging arcs into their next arc along a path that is to be protected. One embodiment builds upon ARC chains and provides for the establishment of a schedule that will leverage the resiliency in a deterministic fashion that will typically overcome multiple losses and typically have no single point of failure. In doing so, one embodiment establishes a schedule that leverages the ARC chain with limited additional latency and limited wasted FEC bandwidth.

An ARC chain typically assumes the general form of a vertical ladder. Each edge of an arc ends in the downstream arc, and the last arc ends in the destination.

One embodiment allocates time slots along the ARC chain to obtain additional redundancy with Packet Replication and Elimination at the edges of the arcs in the chain. In one embodiment, time slots are allocated to forward horizontally a packet inside an arc (typically in both directions) or downwards, from arc to arc. In one embodiment, a path computation engine (PCE) computes an ARC chain to strengthen a path and distributes the information in the impacted nodes.

FIG. 2B illustrates a more complex network of nodes 210 having three arcs: a first arc including nodes 211-214, a second arc including nodes 221-224, and a third arc including nodes 231-233, and a destination node 240. If we assume that the main, shortest path is nodes D1 214 to D2 224 to D3 233 to destination Z4 240, the ARC chain can be considered to "protect" this path as it provides multiple paths for a packet to traverse network of nodes 210 that do not use resource of path D1 214 to D2 224 to D3 233 to destination Z4 240.

Unicast packets will follow the main vertical path D1 214 to D2 224 to D3 233 to destination Z4 240. A loss on any hop means the loss of the packet. Traditional bi-casting (live-live) will follow vertical paths A1 211 to B2 222 to A2 221 to A3 231 to destination Z4 240 and D1 214 to D2 224 to D3 233 to destination Z4 240 in parallel. A loss on both paths means the loss of the packet.

In one embodiment, a packet that enters an arc is copied first along a horizontal path in the ARC and later along the vertical path when all horizontal copies are received. A packet that is lost on a vertical path, say from D1 214 to D2 224, is received along the arc (from C2 223) so D2 224 can still forward to D3 233. One embodiment provides additional protection over single path transmission and over bi-casting, as a loss on each edge of a same ARC is required before a packet is lost.

In one embodiment, the devices are time synchronized, and a transmission schedule can be imposed, either based on timers (such is the case in deterministic Ethernet) or on time slots (with for instance ISA100.11a or 6TiSCH).

One embodiment uses rules to control the NP complete resolution, such as, but not limited to:
  The first slot is a receive slot and the last is a transmit slot.
  There may be intermixed receive and transmit slots in between.
  A node in an ARC is entitled to copy a frame received from a parent ARC as soon as possible inside the ARC, left and right, not down.
  But it does not copy in one direction if it already got the frame from that direction. And the node will not listen on a receive slot if a frame was already received from that direction and may not listen on a receive slot from any direction. Those two rules enable to schedule multiple slots between 2 nodes in a same ARC and yet waste no battery in idle listening or wasteful transmissions.
  Note that the Layer 2 ACK, if any (e.g. 802/15/4) is ignored and can be omitted. The PCE may not schedule any slots for actual retry if it is considered that the replication and elimination adds enough reliability to the system. Rather, another copy may arrive the other way.

Figure 3:
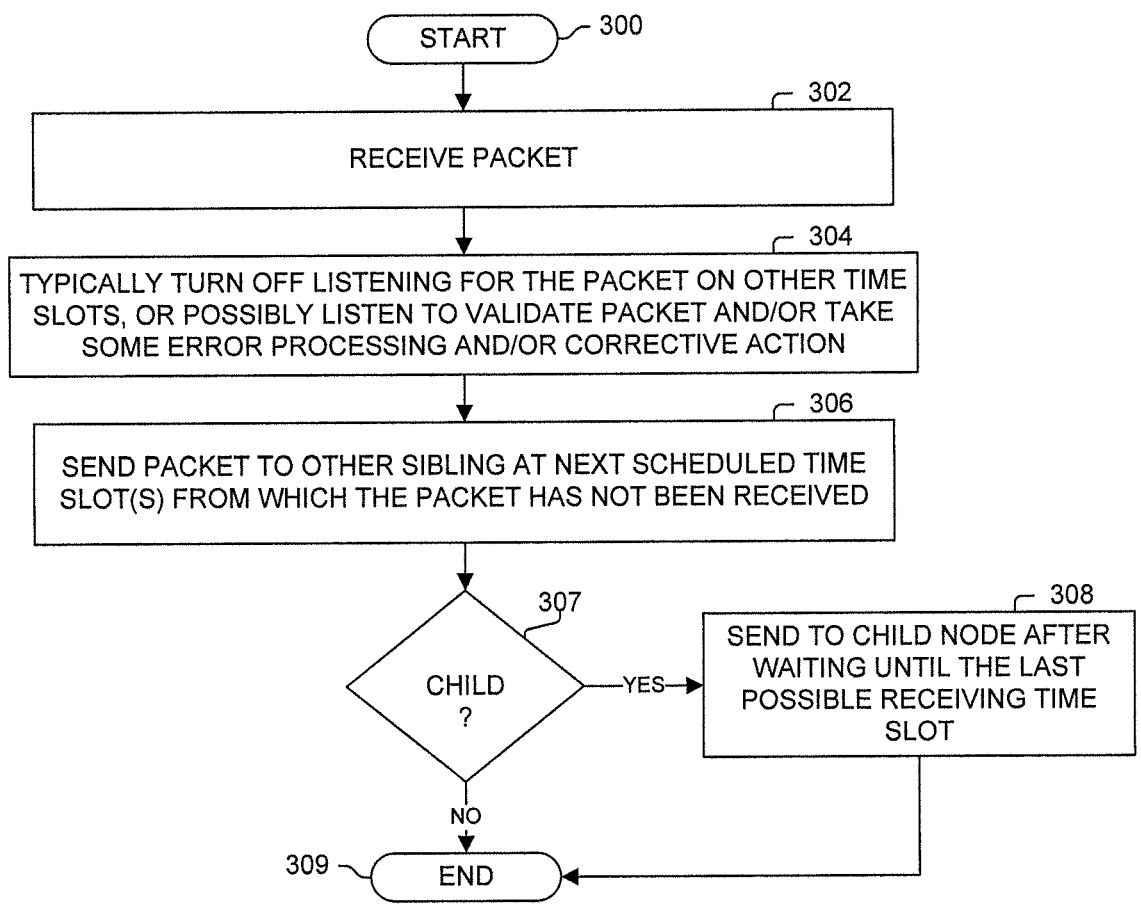
FIG. 3 illustrates a process according to one embodiment.

FIG. 3 illustrates a process performed by a node in one embodiment for forwarding a packet through a network of ARC chains that provide reliable segment routing by plugging arcs into their next arc along a path that is to be protected (e.g., such as, but not limited to that shown in FIG. 2B). In particular, this process illustrates features used in one embodiment of a wireless deterministic network, which typically has constrained nodes whose resources (e.g., battery power, storage, processing) are desired to be conserved. For example, in one embodiment, receivers do not listen to a second time slot for receiving a packet once the packet has been received on another time slot.

Processing begins with process block 300. In process block 302, the node receives a packet from a neighboring node on a same arc (e.g., a sibling) in a first direction. In process block 304, the node typically turns off listening to receive the packet from its other sibling (e.g., if it is not an edge node that only receives from one sibling). In one embodiment, a node may continue to listen and then compare the two received packets to see if there is any difference for which error processing may then be performed. In process block 306, the node sends the packet to its other sibling if it has one (e.g., the sibling from which the packet was not received in process block 302). As determined in process block 307, if the node is an edge node having a child node of a next level ARC chain, then in process block 308, the packet is sent to this child node, typically after waiting until the last possible receiving time slot for the packet by the node. Processing of the flow diagram of FIG. 3 is complete as indicated by process block 309 at the next schedule time.

One embodiment allocates time slots along the ARC chain to obtain additional redundancy with Packet Replication and Elimination at the edges of the ARCs in the chain. In one embodiment, time slots are allocated to forward horizontally a packet inside an arc (typically in both directions) or downwards, from arc to arc. In one embodiment, a path computation engine (PCE) computes an ARC chain to strengthen a path and distributes the information in the impacted nodes.

In one embodiment, a source node requests the PCE to provide a path to a destination node in a wireless deterministic network (802.15.4e TSCH for instance). The PCE computes the path according to the constraints (e.g., latency, energy). For example, the PCE may compute the network of nodes 210 as shown in FIG. 2B. This network of nodes needs to be converted into sending and receiving times slots among the nodes in network 210 to form this topology of ARC chains. One embodiment accomplishes this by splitting the topology into a series of unidirectional segments, either along an arc or along a path. Each segment is now a directed list of a few nodes, that can be provisioned individually. Further, this process allows a PCE to configure and maintain segments individually.

To accomplish this, one embodiment defines:
  the list of nodes from the rightmost node with an incoming ARC to the edge node on its side;
  the list of nodes from the leftmost node with an incoming ARC to the edge node on the other side;
  the list of nodes from the leftmost node with an incoming ARC to the edge node on its side; and
  the list of nodes from the rightmost node with an incoming ARC to the edge node on the other side.
The endpoints of the segments are actually the points of Frame Replication and Elimination. There can be multiple segments starting or terminating at a same node.

In one embodiment, an arc is segmented from each node receiving the packet from a parent arc to each of the two edge nodes of the arc (unless it is an edge node, so a segment to itself is not required). For example referring to FIG. 2B, the arc consisting of nodes 221-224 can be segmented as follows:
  B2 222 to A2 221 to its child A3 231;
  B2 222 to C2 223 to D2 224 to its child D3 233;

D2 224 to C2 223 to B2 222 to A2 221 to its child A3 231; and D2 224 to its child D3 233.

This partitioning lends itself to using recursion or linear programming to determine and install time slots for these segments. In one embodiment, the PCE imposes the exact time slot for each hop, in which case the nodes just apply the PCE configuration. In one embodiment, the PCE leaves some freedom to the nodes to adapt other requirements such as for RPL routes. In the latter case, at each hop along the list, the node negotiates the time slot(s) with the next hop in the exact same fashion it would be done for RSVP based reservation; in terms of time order, all the incoming segments must be received at the points of Frame Replication and Elimination before the outgoing segment on the same side may be scheduled. The segments between the rightmost and leftmost nodes can be scheduled arbitrarily.

In one embodiment, all of the transmission slots for reaching an edge node that a packet could take are scheduled before the transmission of an edge node to its child node in another arc. Thus, the packet has an opportunity to reach the edge node via all of the possible paths before it is transmitted to a child node in a next arc.

In one embodiment, the segment is sent to the first router with metadata that contains (track ID, segment ID, {node ID, time slot data, time slot ID} *) With this information, once a node has negotiated a time slot with the next hop, it passes the message to the next hop over that slot, unless this node is the end of the segment. The slot is then placed in hot standby. The last node of a segment returns the information to the PCE. Upon time out, the PCE may either retry or compute an alternate segment, or try a smaller segment to isolate the issue. When all segments are ACKed, the PCE can enable each segment in parallel—or in whatever sequence it prefers. When all are enabled, the PCE sends a message authorizing the source for transmission. This last step can be done by authorizing all the first hop if the PCE has no control of the source; in any case, this results in the flow starting.

Figure 4A:
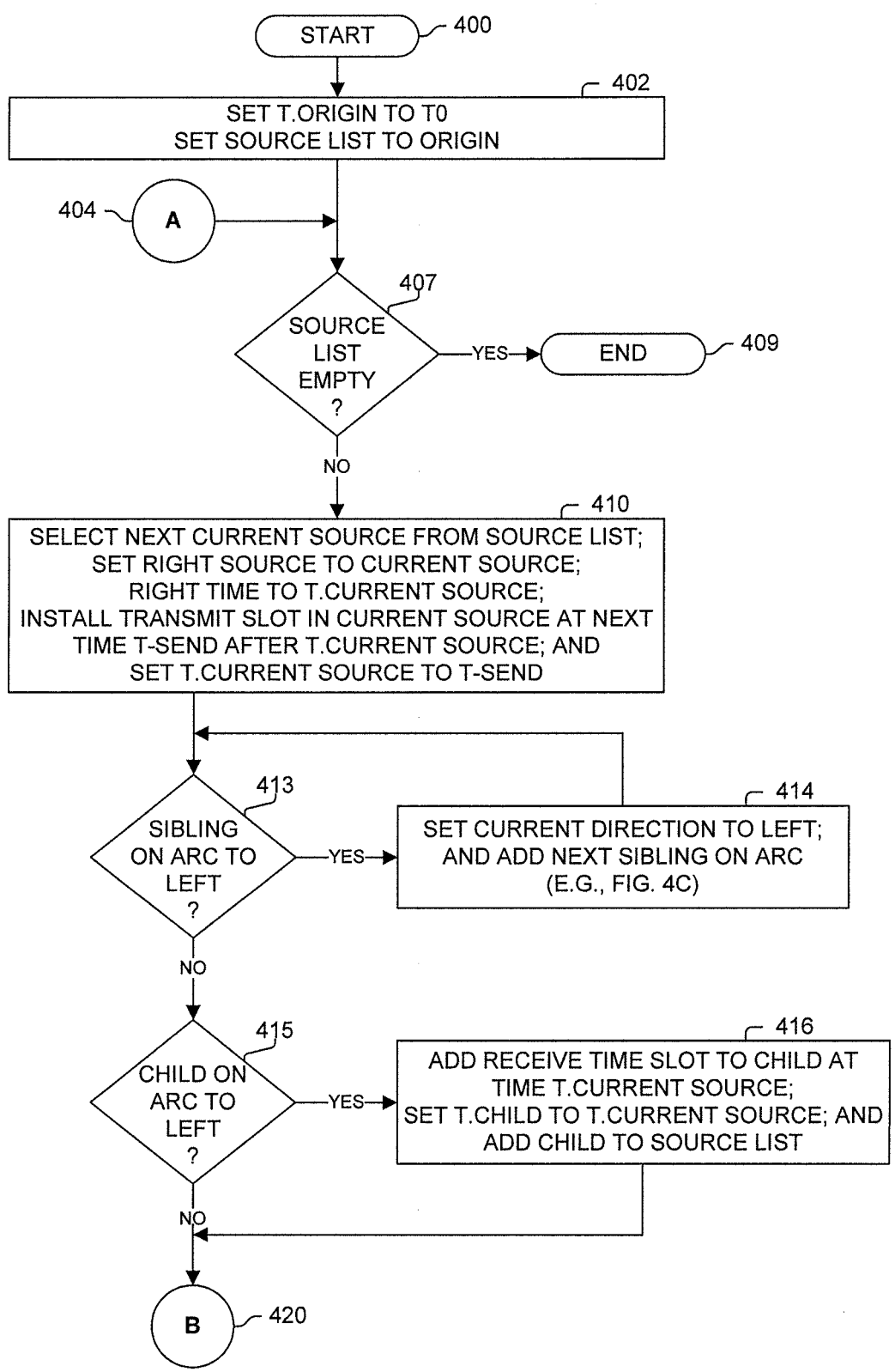
FIGS. 4A-C illustrate a process according to one embodiment.
Figure 4B:
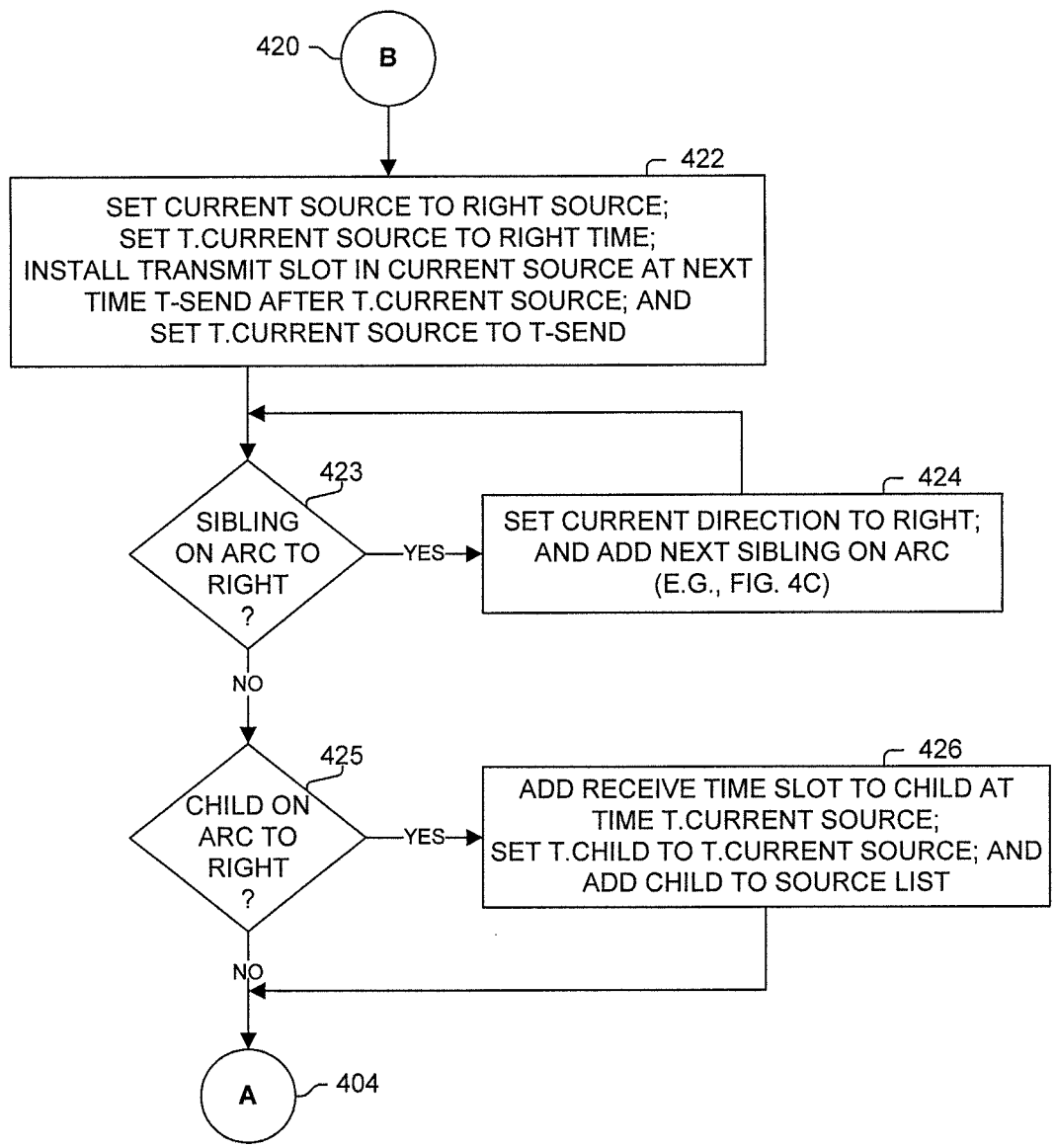
Figure 4C:
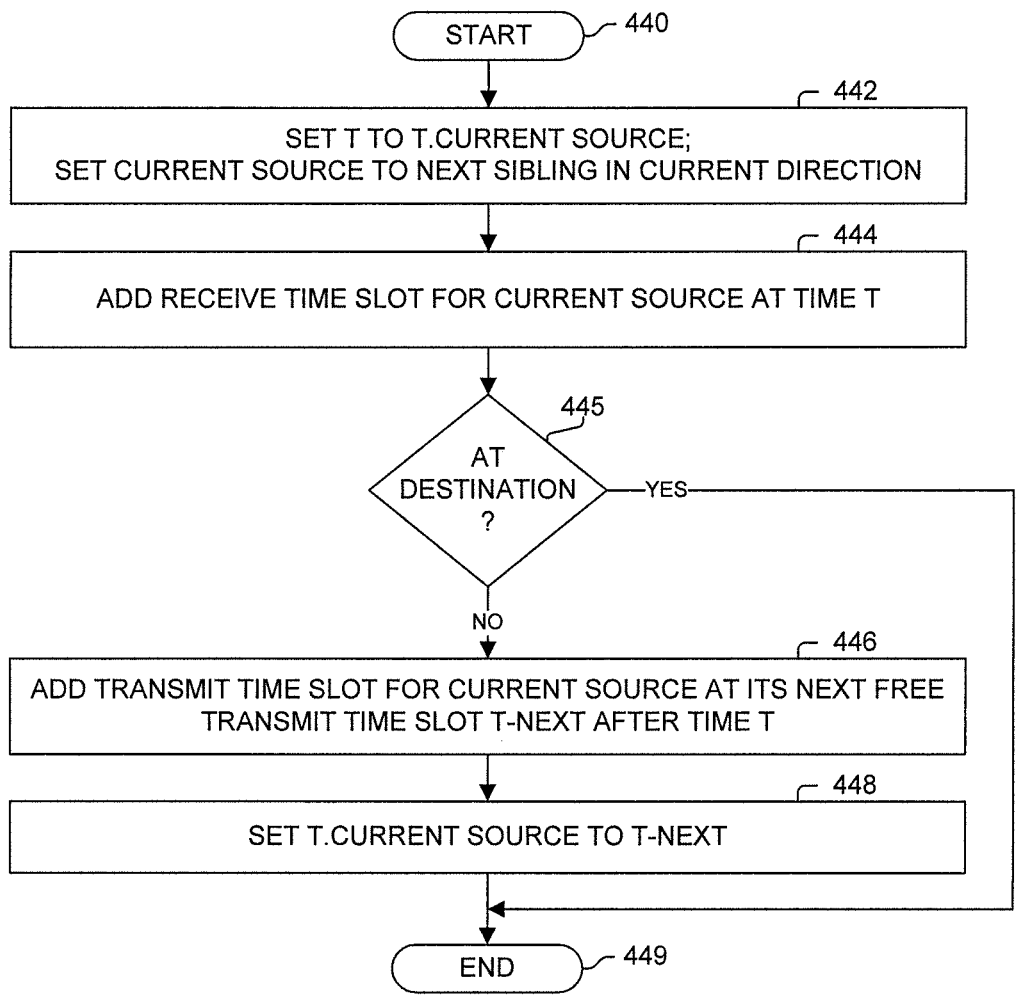

A process performed in one embodiment for determining and installing time slots for reliably communicating a packet through a hierarchical ARC chain as illustrated by FIGS. 4A-C. One embodiment uses recursion. One embodiment uses linear programming.

As previously discussed, a packet is propagated from each node in each direction (e.g., left and right) until the packet reaches each edge node of an arc. In provisioning the time slots, one embodiment ensures there is a time slot to communicate each packet through the network of nodes. During run time, a node might not propagate a packet to a node from which it already received the packet, but one embodiment provisions a time slot for a complete transmission of packets through the network. In doing so, there must be linear timing (e.g., node A must receive the packet before it can send it to a node B).

Processing of the flow diagram of FIG. 4A begins with process block 400. In process block 402, the time associated with the origin ("T.ORIGIN") is set to T0—the time after which the originating node within the network of nodes may send the first packet. The source list of nodes to process is initialized to the origin node (initial sending node in the network).

Each node will be provisioned to send the packet twice—one time to the left (either to a sibling or to a child) and one time to the right (either to a sibling or to a child).

As determined in process block 407, if the source list is empty, processing is complete as indicated by process block 409. Otherwise, there are one or more source nodes (e.g., a node that is the initial sending node, or node that receives a packet from a parent node in another arc) to configure its sending to the right and left, and processing proceeds to process block 410.

In process block 410, the next current node is selected from the source list. Because the path to the left edge node will be computed first in the loop of process blocks 413-416, some initial information is kept for subsequent processing of the path to the right edge node in the loop of process blocks 423 to 426. In this regard, right source is set to the current node, and RIGHT TIME is set to the time of the current node (T.current source). A transmit time for sending to a node to the left of the current source node is installed at a next time T-send after T.current source, and T.current source is set to T-send.

As determined in process block 413, while the current source has a sibling on the arc to its left, then in process block 414, the current direction is set to LEFT, and the next sibling is added, such as via the process of FIG. 4C.

Processing of the flow diagram of FIG. 4C begins with process block 440. In process block 442, a temporary variable T is set to T.current source; and the current source is set to its neighbor sibling in the current direction. In process block 444, a receive time slot is established for current source at time T (the time already installed for sending the packet to the current source). As determined in process block 445, if the current source is the destination of the packet, then processing of the flow diagram of FIG. 4C is complete as indicated by process block 449. Otherwise, the current node is configured to send the packet at its next free transmit slot after time T (the time it received the packet), with the time of the current node (T.current node) set to this next free transmit time in process blocks 446-448. Processing of the flow diagram of FIG. 4C is complete as indicated by process block 449.

Returning to FIG. 4A, processing of process block 414 continues, with processing returning to process block 413. The loop of process blocks 413-414 continues until the left edge node is reached, with processing then proceeding to process block 415. As determined in process block 415, if the left edge node has a child (e.g., it is not the destination of the packet), then in process block 416, a receive time slot is added to the child to receive the packet from this left edge node (current source); and T.child is set to T.current source (e.g., the child node's receive time of the packet); and the child is added to the end of the source list. In one embodiment, the time slot for sending to the child is after all time slots in which the packet could be received from a sibling. Processing then traverses from connector 420 of FIG. 4A to connector 420 of FIG. 4B.

Processing continues in process block 422, where information is initialized for provisioning the transmission of the packet to the right edge node. The current source is set to the node maintained in right source, and its T.current source set to RIGHT TIME. A transmit time is also installed in the current source after the time T.current source (for transmitting its packet to it's right sibling or child), and T.current source is set to this transmit time. Processing of the right direction of process blocks 423-426 is basically the same as that of process blocks 413-416, just going in the opposite direction.

As determined in process block 423, while the current source has a sibling on the arc to its right, then in process block 424, the current direction is set to RIGHT, and the next sibling is added, such as via the process of FIG. 4C. The loop of process blocks 423-424 continues until the right edge node is reached, with processing then proceeding to process block 425. As determined in process block 425, if the right edge node has a child (e.g., it is not the destination of the packet), then in process block 426, a receive time slot is added to the child to receive the packet from this right edge node (current source); and T.child is set to T.current source (e.g., the child node's receive time of the packet); and the child is added to the end of the source list. In one embodiment, the time slot for sending to the child is after all time slots in which the packet could be received from a sibling. Processing then traverses from connector 404 of FIG. 4B to connector 404 of FIG. 4A to repeat this processing of a next current source in the source list until this list becomes empty.

One embodiment uses Operations, Administration, and Maintenance (OAM) techniques adapted for deterministic wireless networks using various modes of operation. In one embodiment, a network is a Low power and Lossy Network (LLN). In one embodiment, at least a portion of the network uses deterministic communication. In one embodiment, this OAM is used to determine when and where alternate paths are used in the network. In one embodiment, resources in a deterministic wireless network are optimized, potentially even allowing more flows to be admitted in the network and improve Service Level Agreement performance.

One embodiment uses in-band or out-of-band OAM probes using bit flags or counters in order to determine whether alternate paths (called ARC in ARC based network) have been used between a source and a destination, using a coloring mechanism (i.e., differentiating sets of one or more packets in an identifiable manner such as by including different one or more bits or counter values, etc., in each packet such that a system can identify which of the two or more sets a received packet is a member).

One embodiment dynamically controls the topology so as to remove and add alternate paths in such topology, considering how critical it is to determine whether alternate paths are indeed used (e.g., a path in a time-based network costs resource). One embodiment uses a receiver for requesting the origination of a set of in-band OAM probes in order to determine which path segment and/or ARC is currently being used in the network. A closed loop is used between the source and destination to control the frequency of such probes. One embodiment uses a first mode of distributed operation where permanent detours are activated and alternate paths (e.g., arc) are activated/deactivated. One embodiment uses a second centralized operation mode consisting of reporting to the path computation engine, network management system, or other entity, that in turns decides (optionally after triggering out-of-band OAM) to activate a detour, activate/deactivate alternate path according to a number of parameters such as the degree of saturation of the network (e.g., in order to free up resources whenever possible), traffic Service Level Agreements (e.g., especially in case of very lossy networks), etc.

One embodiment sends OAM information "in band," that is, the OAM signaling is generated by a node within the network (e.g., by an end node—in contrast to a path computation engine, network manager, or other control entity). Alternatively or in addition in one embodiment, "in band" OAM may refer to OAM information piggybacked in a data packet (e.g., so extra time slots are not necessarily required to transmit separate OAM control packets).

A reliable ARC chain assumes the general form of a vertical ladder. Time slots are allocated to forward horizontally a packet inside an ARC (in both directions) or downwards, from arc to arc. Each edge of an arc ends in the downstream arc, the last arc ends in the destination.

ARC chains or ladders provide a redundancy by allowing packet replication and elimination at the edges of the arc. A packet that enters an ARC chain is copied first along a horizontal path in the ARC chain and later along the vertical path when all horizontal copies are received. One embodiment determines whether replications along the arcs should be used or could be suppressed.

Figure 5A:
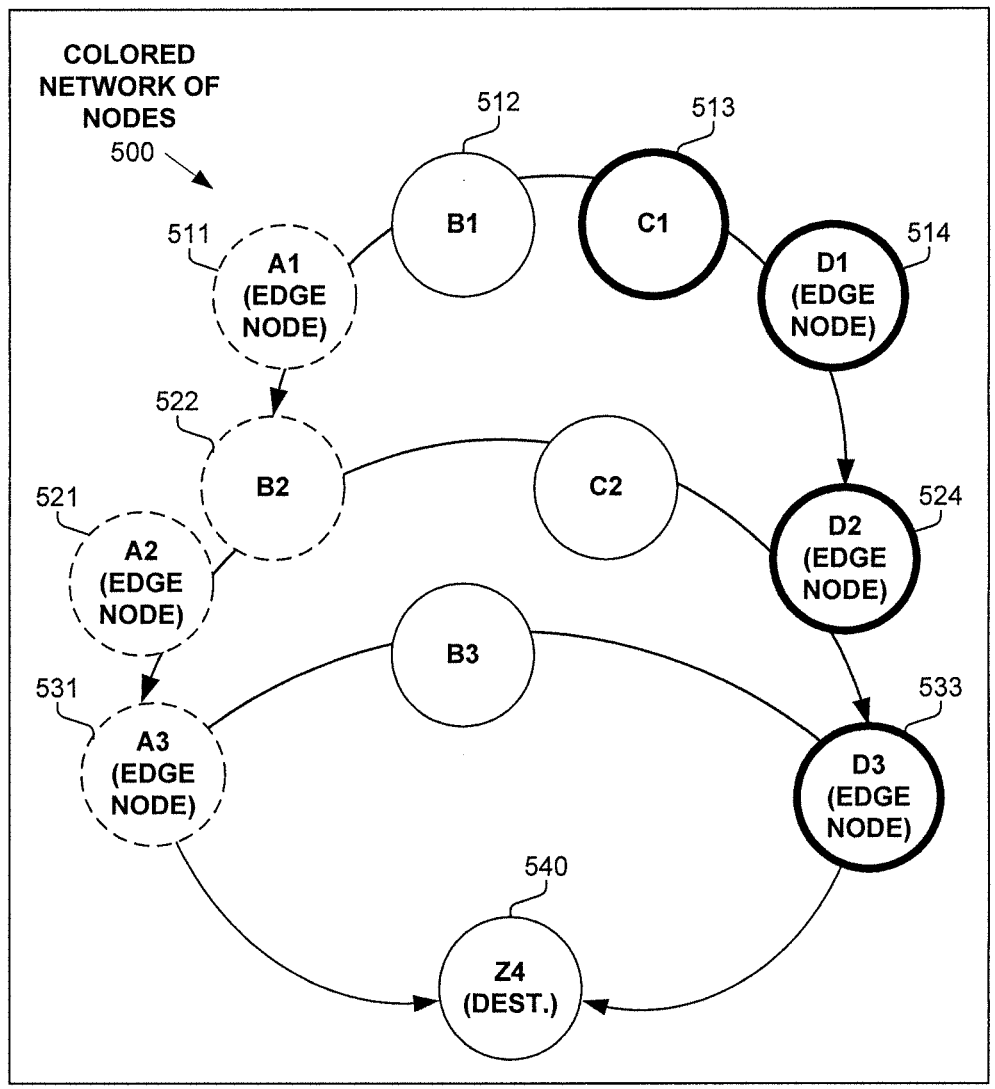
FIG. 5A illustrates a colored network of nodes according to one embodiment.

One embodiment discovers whether a loss occurred on either of the main parallel paths, that is the left and right sides of the ARC chain. FIG. 5A illustrates a colored network of nodes 500 according to one embodiment. As shown, there are two colored parallel paths—a main path from source node 512 traversing black-colored nodes 513, 514, 524 and 533; and a parallel path from source node 512 traversing white-colored nodes 511, 522, 521 and 531. Using colors, the destination can then determine whether or not a packet traverse nodes of only a single color or both colors regardless of the path through an ARC.

One embodiment uses topology different than ARC, with these process operations applicable to other forms of time synchronized driven topologies. In one embodiment, a path computation engine, network management system, or other entity computes an ARC chain or ladder to strengthen a path and distributes the information in the impacted nodes.

One embodiment uses a bit in the packet header for each of the main and parallel paths. A node on a path will set it on each frame that it forwards, either along the associated path or an ARC that links to other parallel paths. The bits for the other paths are not touched by a node on this path. In one embodiment when a node receives multiple copies of a same packet (e.g., copies coming along the ladder steps, ARC chains), the copy that came from the path that is being used is forwarded and the other copies are dropped. Thus, a packet that was never lost along the associated path only has the bit set for that path. In case of a loss, the copy received over the ladder will be marked with the bit for the alternate path over which it was carried. This bit is maintained throughout the network so that the destination knows that a loss occurred on that path. One embodiment indicates which slot encountered the first failure on a path by adding a reference to that slot in the packet when forwarding a frame with the wrong bit set (e.g., the frame was not received with the right bit set). One embodiment has more than the paths in an ARC chain or other topology, and uses as many bits or counters as there are paths and applies the same basic logic. One embodiment uses a bit per segment when the ARC chain is segmented. When a frame exits a segment, a bit that is associated to that segment is set in the header.

Figure 5B:
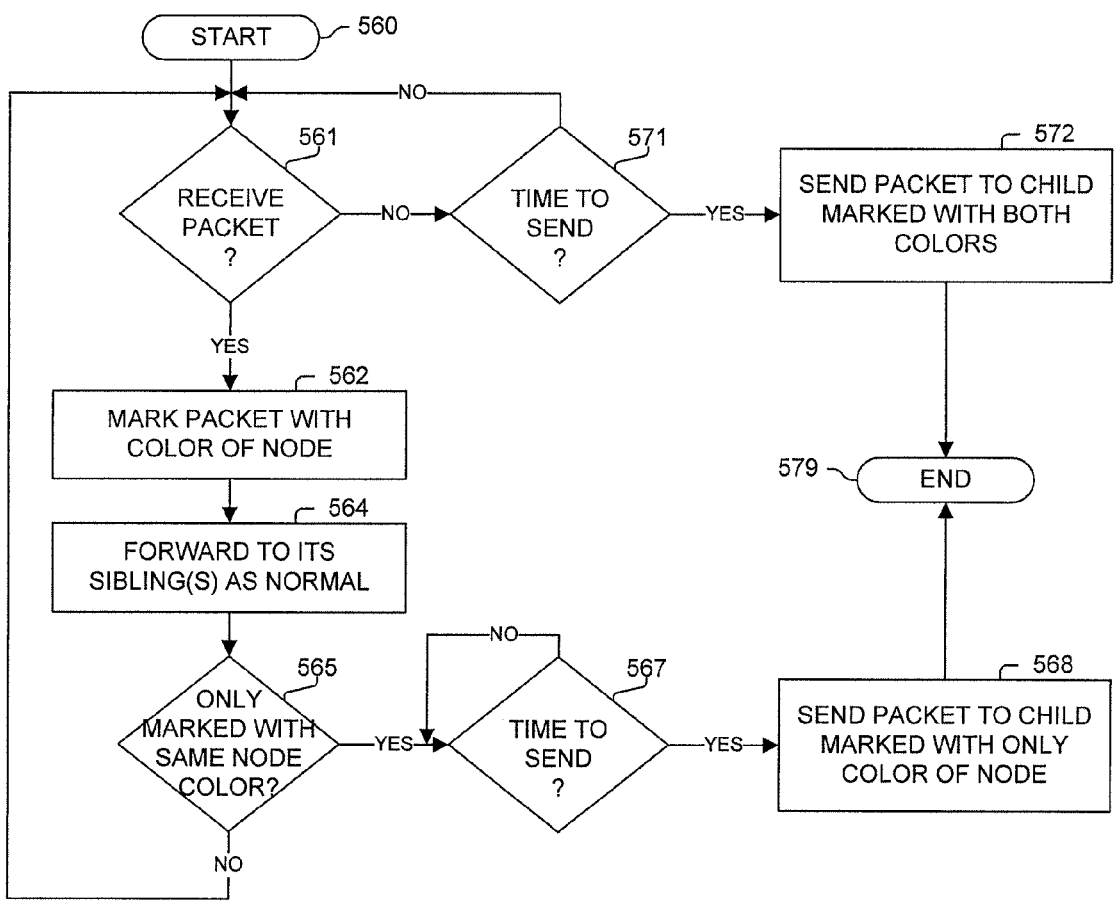
FIG. 5B illustrates a process for checking for a redundant path in a colored network according to one embodiment.

FIG. 5B illustrates a process performed in one embodiment by an edge node having been assigned a color. Processing begins with process block 560. When a packet is received as determined by process block 561, then in process block 562, the received packet is marked with the color of the receiving node. In process block 564, the packet is immediately forwarded to its sibling node(s) as normal. In one embodiment, a packet is only sent to a sibling node if it did not receive that packet from the sibling node.

As determined in process block 565, if the packet is marked with only the same color as the node, then processing proceeds to process block 567 to wait until it is time to send the packet. When time to send, then in process block 568 the packet is sent to its child node, and processing of the flow diagram is complete as indicated by process block 579. By selecting to sending a packet only marked with the color of the node over a packet with both colors, the integrity of a packet only traversing the primary or parallel path can be confirmed. Hence, the operations of process block 565-568.

Otherwise, as determined in process block 565, the packet is now marked with both colors, and processing returns to process blocks 561-562 to either wait for receiving another packet (e.g., one only marked with the color of the node) or it is time to send a packet, and then this packet marked with both colors is sent in process block 572. Processing of the flow diagram of FIG. 5B is complete as indicated by process block 579.

One embodiment sends OAM information "out of band", that is, the OAM signaling is generated by a path computation engine, network manager, or other control entity (e.g., in contrast to a network node). Alternatively or in addition, "out of band" refers to OAM information communicated in extra time slots provisioned for communicating the OAM information (e.g., OAM packets) in order to measure or control performance during runtime. In one embodiment, the OAM packet is generated by the path computation engine, network manager, or other control entity and/or the source (e.g., first node to send the packet in the wireless deterministic network). In one embodiment, the path computation engine, network manager, or other control entity triggers the process for communicating, collecting and/or analyzing OAM information. In one embodiment, these processes run periodically, permanently, triggered in response to some condition, or invoked by some other mechanism.

One embodiment uses OAM probe packets to determine when alternate paths are used in time synchronized deterministic networks. One embodiment uses an Available Routing Construct (ARC) chain or a ladder topology in order to recover multiple losses and yet maintain a deterministic schedule. One embodiment uses a different topology. One embodiment uses off-line computation of routing topology.

One embodiment sends an OAM frame that is flooded in all time slots that are associated to a reliable deterministic track such as an ARC chain or a ladder topology. One embodiment uses a compressed variation whereby only one bit (or some small number of bits) per time slot is used per packet. In one embodiment, the whole bitmap can fit in a packet header (e.g., an IEEE 802.15.4 Information Element) and piggybacked with normal traffic. By using one or more of these techniques, one embodiment communicates the OAM frame in the exact same slots that it are being tracked/measured.

Figure 6A:
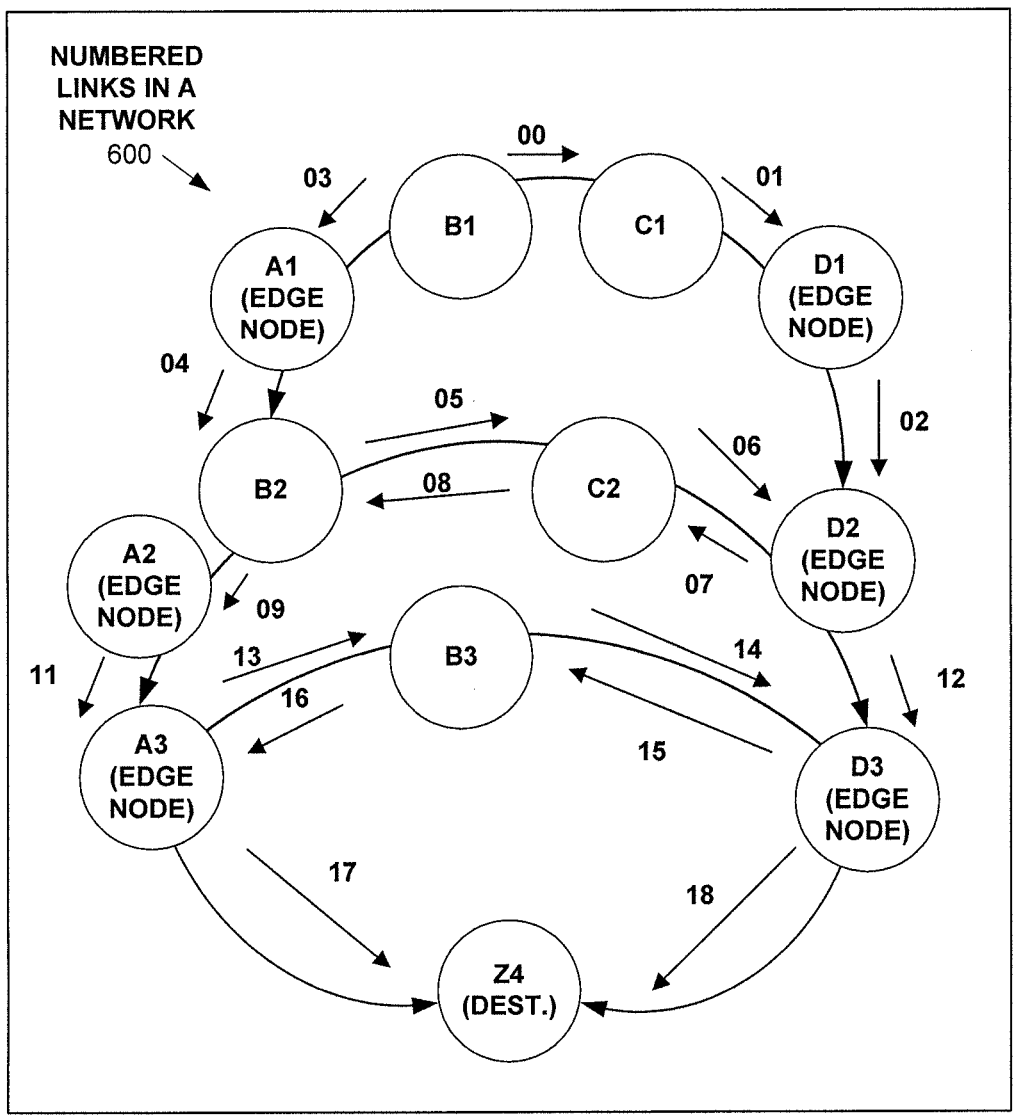
FIG. 6A illustrates numbered links in a network of nodes according to one embodiment.

In one embodiment, each time slot is allocated a unique number (uniquely significant for a given track) that is provided with the track information as a track is being laid out. FIG. 6A illustrates one such network 600 wherein each time slot is assigned a unique number, in this case, the numbers 0 to 18. The time slot number is used as an offset in a table. The table may contain just one bit per entry (in that case it is a bitmap), or more information like a counter that would be maintained by the nodes for each incoming slot.

The OAM frame is sent by the origin of a track with the table as content and flooded along all the time slots in the ladder but with no saving for packets already received. Upon each reception, the bit for the time slot number in the bitmap is set, and the bitmap is OR'ed with previous copies of the same bitmap in the same OAM frame already received for previous time slots of the same iteration.

When all copies of the OAM frame are received at the destination and the destination has also OR'ed them all, the resulting bit map has all the bits set for the successful transmissions, giving an overview on loss and role of the ladder. Note that the processing of OAM frames (potentially carried within data packets) provides very useful information to the path computation engine on the use of the different sections of the ladder. In one embodiment, a different data structure other than a bitmap (which includes one or more bitmaps) is used, such as, but not limited to, one or more lists, arrays, or other data structures.

Figure 6B:
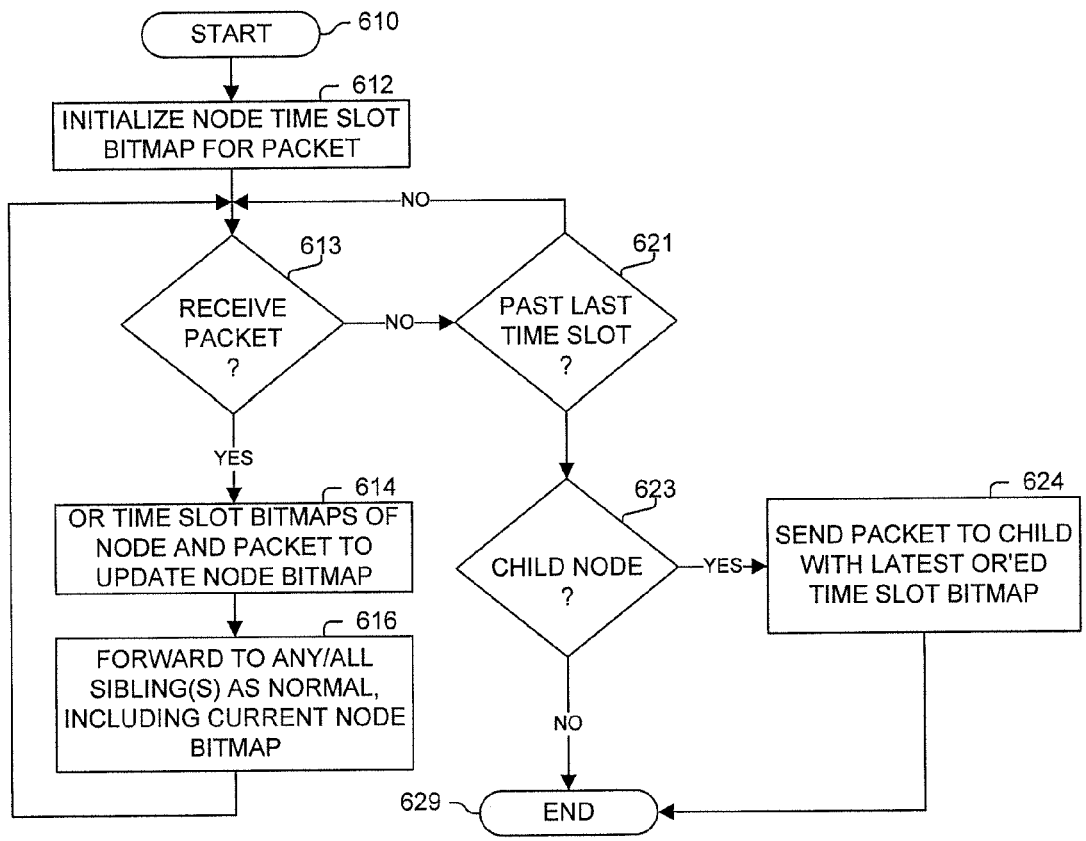
FIG. 6B illustrates a process for checking availability of each link in a network according to one embodiment.

A process performed in one embodiment by a node is illustrated by FIG. 6B. Processing begins with process block 610. In process block 612, a node bitmap for each possible link is initialized to all zeros. When a packet is received as determined in process block 613, then in process block 614, the node bitmap is OR'ed with the bitmap received in the packet, with the result replacing the node bitmap. In process block 616, the packet is immediately forwarded to its sibling node(s) as normal. In one embodiment, a packet is only sent to a sibling node if it did not receive that packet from the sibling node. Processing returns to process blocks 613 and 621 to loop until another copy of the packet is received or it is past the last time slot for receiving a copy of the packet. As determined in process block 623, if the node is an edge node (e.g., it has a child), then in process block 624, the packet is sent to the child with the latest copy of the node bitmap. Processing of the flow diagram of FIG. 6B is complete as indicated by process block 629.

In one embodiment, the OAM probing is initiated by a network management system, path computation engine, or other entity. In one embodiment, the OAM field is a standalone frame. In one embodiment, the OAM field is carried within a data packet.

In one embodiment, if the table is used for counters, the operation is similar but a node writes a counter of failed receptions since the previous OAM, and again merges the table with other versions of that table received over other time slots for the same OAM frame. One embodiment uses counters. One embodiment uses bits. Note that the use of counters instead of "bits" provide more information at the extra-cost of additional overhead.

In one embodiment, when the aggregation reaches the destination, the OAM information is sent back to a path computation engine, network management system, or other entity in order to establish which links are unreliable and which copies arrive based on the two OAM frames.

One embodiment uses a small bitmap that is inserted as a frame header (an IEEE 802.15.4e) in the next possible packet. By using this technique, one embodiment avoids the unpleasant packet drop when there is no empty slot that can be used for a separate OAM frame.

In one embodiment, the path computation engine, network management system, or other entity may decide to switch between the bit and counter mode based on the set of received feed-back. If it is determined that the network is very lossy (by inspecting for example the RSSI of the links in the network, the ETX value of those links, or unexpected delays that may be due to retransmission at the MAC layer in the network), the path computation engine, network management system, or other entity may decide to switch from the bit mode to the counter mode dynamic to gather more data. Switching between the two modes may be driven by observation of the degree of lossiness in the network, or may be performed periodically (e.g., every X minutes or hours) according to the policy or even the degree of saturation of the network resource.

One embodiment removes and adds provisioned alternate paths from current usage, or removes these paths/timeslots, based on how often an alternate path is used, how critical is the traffic, etc. The replication process makes the data path a lot more reliable and still deterministic, because it does not involve retries; yet it introduces some latency (use of time slot) and consumes additional energy. One embodiment tunes dynamically the use of the horizontal (alternate) path based on OAM (forwarding plane) control messages, according to the use of these paths, which cannot be a priori determined when computing the topology by a path computation engine, network manager, or other entity.

Figure 6C:
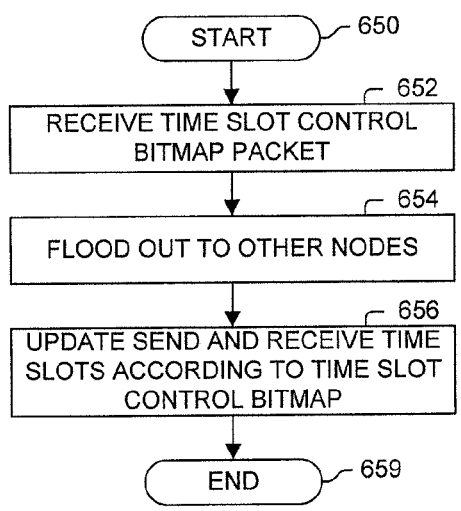
FIG. 6C illustrates a process for controlling the use of each link in a network according to one embodiment.

In one embodiment, the control message includes a bitmap with each bit corresponding to a different time slot, such as that illustrated in FIG. 6C. Rather than modifying the bitmap as it traverses the node as done in FIG. 6B, this bitmap indicates which particular time slots are to be used, and which time slots are not to be used (e.g., a one in a corresponding location indicates to use the time slot for sending and receiving a packet, and a zero in a corresponding location indicates not to use the time slot for sending and receiving a packet).

FIG. 6C illustrates a process performed in one embodiment. Processing begins with process block 650. In process block 652, the time slot control bitmap is received in a packet (e.g., control packet flooded through the network). In process block 654, this packet is flooded out to other node(s). In process block 656, the node updates its sending and receiving timeslots based on the received time slot control bitmap. Processing of the flow diagram of FIG. 6C is complete as indicated by process block 659.

One embodiment augments rapidly the redundancy of the network by using the segments along the ARCs as soon as an error is detected that a corresponding ARC can protect. If the error persists, the ARC may be left in place until the path computation engine, network management system, or other entity recomputes a new routing scheme. Because such alternate path (e.g. ARC) may be very costly in a deterministic wireless network, it typically becomes of the utmost importance to dynamically adapt the topology according to the measured usage of these paths.

When a loss is detected by the destination, the node sends a message (e.g., unicast message, piggybacked in an upper-layer ACK or other message sent by the destination to the source) to the source asking for an OAM in-band evaluation such as discussed supra. In one embodiment, the destination may immediately send a request to the source. Alternatively in one embodiment, the destination may initiate such a request after N errors, and for example, asking for the generation of M in-band OAM probes for a period of T seconds with one OAM probe every Z messages. This triggers the generation of OAM by the source. The OAM messages are used to gather data from the counters and locates problems in the network. In one embodiment, the OAM contains a bit map for each slot. If that bitmap is small enough, it may be inserted as a frame header (e.g., IEEE 802.15.4e) in the next possible packet. If the problem points are in the ARC links (the ladder steps), the links are simply disabled. If the problem point is along a main path, the ARCs above and below are enabled.

One embodiment uses a distributed mode of operation. In this mode, the use of main links and ARCs are evaluated based on the gathering of statistics provided by the received in-band probes. If the destination determines that a main link is constantly failing, alternate path(s) are activated contouring the failed link and a notification is sent back to the path computation engine, network management system, or other entity to inform that a time slot can be freed up and the topology may be recomputed. If an ARC (alternate path) is never used, such data is equally important and a similar report is sent back to the path computation engine, network management system, or other entity in order to notify the path computation engine, network management system, or other entity that the ARC has been disabled.

One embodiment uses a mode based on a path computation engine, network management system, or other entity. In a centralized mode of operation, reports are generated to the path computation engine, network management system, or other entity, but no action is taken by the nodes in the network (e.g., detours are not dynamically/permanently activated) and ARC cannot be activated or deactivated. Reports are generated by destinations at which point the path computation engine, network management system, or other entity may decide to potentially disable an unused ARC. Note that such a decision can be driven by the saturation state of the network. The path computation engine, network management system, or other entity may determine that an ARC may free up time slot(s) thus allowing other flows to be admitted in the network. Conversely, the path computation engine, network management system, or other entity may decide to reactivate an ARC if it determines that many counter-based OAM reports a large use of all ARCs between a source and destination to ensure more redundancy. In one embodiment, the path computation engine, network management system, or other entity may decide to trigger an out-of-band OAM flooding to get an accurate picture of the link states in the time synchronized network. In this mode of operation, a message is specified that allows a path computation engine, network management system, or other entity to send a unicast message to a node requesting the use of a detour for X seconds or permanently, or to activate/deactivate an ARC according to the various parameters listed above.

Figure 7A:
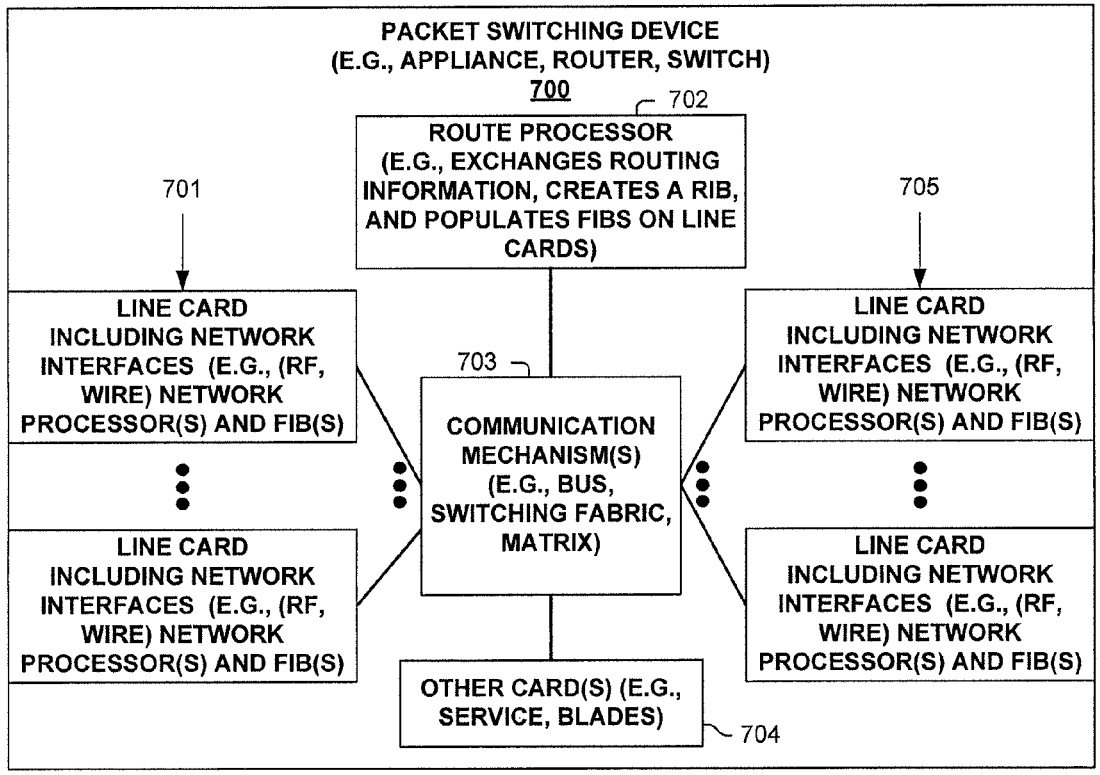
FIG. 7A illustrates a packet switching device according to one embodiment.

One embodiment of a packet switching device 700 (e.g., one example of a network node) is illustrated in FIG. 7A. As shown, packet switching device 700 includes multiple line cards 701 and 705, each with one or more network interfaces for sending and receiving packets over communications links, and with one or more processing elements that are used in one embodiment associated with networks of nodes configured to communicate according to a configuration of ARC chains. Packet switching device 700 also has a control plane with one or more processing elements 702 for managing the control plane and/or control plane processing of packets associated with networks of nodes configured to communicate according to a configuration of ARC chains. Packet switching device 700 also includes other cards 704 (e.g., service cards, blades) which include processing elements that are used in one embodiment to process packets associated with networks of nodes configured to communicate according to a configuration of ARC chains, and some communication mechanism 703 (e.g., bus, switching fabric, matrix) for allowing its different entities 701, 702, 704 and 705 to communicate. In one embodiment, packet switching device 700 has one or more RF interfaces (possibly only one such interface), such as, but not limited to that based on IEEE 802.15.4e.

Figure 7B:
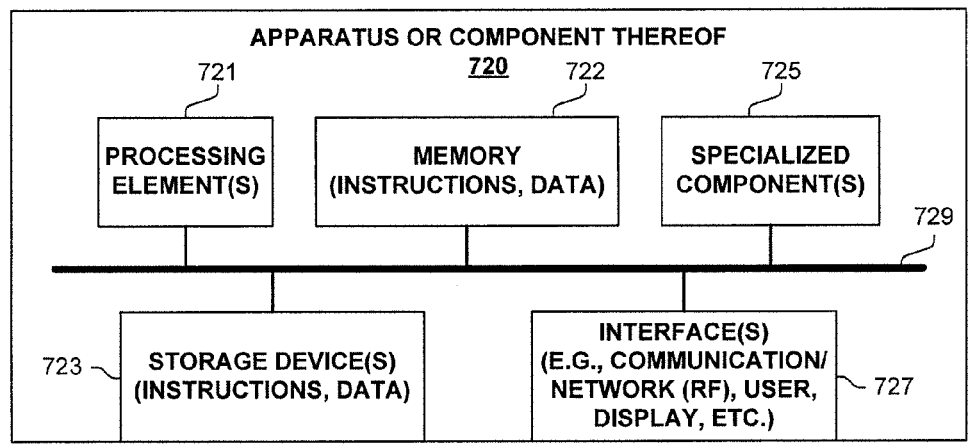
FIG. 7B illustrates an apparatus according to one embodiment.

FIG. 7B is a block diagram of an apparatus 720 (e.g., path definition agent, a node, or portion thereof) used in one embodiment associated with networks of nodes configured to communicate according to a configuration of ARC chains. In one embodiment, apparatus 720 performs one or more processes, or portions thereof, corresponding to one of the flow diagrams illustrated or otherwise described herein, and/or illustrated in another diagram or otherwise described herein.

In one embodiment, apparatus 720 includes one or more processing element(s) 721, memory 722, storage device(s) 723, specialized component(s) 725 (e.g. optimized hardware such as for performing lookup and/or packet processing operations, etc.), and interface(s) 727 for communicating information (e.g., sending and receiving packets, user-interfaces, displaying information, etc.), which are typically communicatively coupled via one or more communications mechanisms 729, with the communications paths typically tailored to meet the needs of a particular application. In one embodiment, interface 727 is one or more RF interface (possibly a single interface), such as, but not limited to that based on IEEE 802.15.4e.

Various embodiments of apparatus 720 may include more or fewer elements. The operation of apparatus 720 is typically controlled by processing element(s) 721 using memory 722 and storage device(s) 723 to perform one or more tasks or processes. Memory 722 is one type of computer-readable/computer-storage medium, and typically comprises random access memory (RAM), read only memory (ROM), flash memory, integrated circuits, and/or other memory components. Memory 722 typically stores computer-executable instructions to be executed by processing element(s) 721 and/or data which is manipulated by processing element(s) 721 for implementing functionality in accordance with an embodiment. Storage device(s) 723 are another type of computer-readable medium, and typically comprise solid state storage media, disk drives, diskettes, networked services, tape drives, and other storage devices. Storage device(s) 723 typically store computer-executable instructions to be executed by processing element(s) 721 and/or data which is manipulated by processing element(s) 721 for implementing functionality in accordance with an embodiment.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method comprising:
    forwarding a particular packet through an Available Routing Construct (ARC) chain topology network towards a destination node, with the ARC chain topology network including a plurality of network nodes organized into a plurality of arcs, with each of the plurality of network nodes being a physical device including a processor, memory and an network interface, with each of the plurality of arcs having two edge nodes and one or more non-edge nodes, and with the ARC chain topology network configured to progressively forward a packet through different arcs of the plurality of arcs including for each current arc of the plurality of arcs: communicating the packet along the current arc to each of said edge nodes of the current arc and then from each of said edge nodes of the current arc to nodes of a next current arc of the plurality of arcs towards a destination of the packet; and wherein said forwarding the particular packet through the ARC chain topology network towards the destination node includes:
    sending the particular packet by each particular non-edge node on an arc of the plurality of arcs receiving the particular packet to each sibling on the arc that did not send the particular packet to said particular non-edge node, while not sending the particular packet if it was received from both siblings of said particular edge node; and
    sending the particular packet to a respective child node on a second arc of the plurality of arcs by each particular edge node of two edge nodes on the arc after receiving the particular packet.

2. The method of claim 1, wherein said each particular edge node waits until after all possible time slots that it could respectively receive the particular packet before said sending of the particular packet.

3. The method of claim 2, wherein the network is a deterministic wireless network with pre-assigned time slots for sending and receiving the particular packet by each non-edge node and each edge node of the arc.

4. The method of claim 3, wherein each non-edge node on the arc includes at least two time slots for receiving the particular packet and at least two time slots for sending the particular packet.

5. The method of claim 3, wherein each non-edge node on the arc has exactly two time slots for receiving the particular packet and has exactly two time slots for sending the particular packet.

6. The method of claim 3, including not listening by a particular non-edge node of the arc at a predetermined receive time slot for receiving the particular packet from a first sibling on the arc in response to previously receiving the particular packet from a second sibling on the arc.

7. The method of claim 1, wherein the network is a deterministic wireless network with pre-assigned time slots for sending and receiving the particular by each non-edge node and each edge node of the arc.

8. The method of claim 7, wherein each non-edge node on the arc includes at least two time slots for receiving the particular packet and at least two time slots for sending the particular packet.

9. The method of claim 7, wherein each non-edge node on the arc has exactly two time slots for receiving the particular packet and has exactly two time slots for sending the particular packet.

10. The method of claim 7, including not listening by a particular non-edge node of the arc at a predetermined receive time slot for receiving the particular packet from a first sibling on the arc in response to previously receiving the particular packet from a second sibling on the arc.

11. A method, comprising:
    forwarding a particular packet through an Available Routing Construct (ARC) chain topology network towards a destination node, with the ARC chain topology network including a plurality of network nodes organized into a plurality of arcs, with each of the plurality of network nodes being a physical device including a processor, memory and an network interface, with each of the plurality of arcs having two edge nodes and one or more non-edge nodes, and with the ARC chain topology network configured to progressively forward a packet through different arcs of the plurality of arcs including for each current arc of the plurality of arcs: communicating the packet along the current arc to each of said edge nodes of the current arc and then from each of said edge nodes of the current arc to nodes of a next current arc of the plurality of arcs towards a destination of the packet; and wherein said forwarding the particular packet through the ARC chain topology network towards the destination node includes:
    receiving, by a first node in the ARC chain topology network on a second arc of the plurality of arcs, the particular packet from a parent on a first arc of the plurality of arcs;
    forwarding, by the first node, the particular packet to each of a left sibling and a right sibling on the second arc;
    receiving, by each of the left sibling and the right sibling, the particular packet;
    receiving by an edge node of the second arc the particular packet; and
    forwarding, by the edge node to a third node in a third arc of the plurality of arcs, the particular packet after waiting to ensure that another copy of the packet cannot be received by the edge node.

12. The method of claim 11, wherein the left sibling has a second left sibling to the left of the left sibling on the second arc; and wherein the method includes not listening to receive the particular packet from the second left sibling in response to the left sibling receiving the packet from the first node.

13. The method of claim 11, wherein the network is a deterministic wireless network with pre-assigned time slots for sending and receiving the particular packet by the first node, the left sibling, the right sibling, the edge node, and the third node.

14. The method of claim 13, wherein each of the left sibling and the right sibling includes at least two time slots for receiving the particular packet and at least two time slots for sending the particular packet.

15. The method of claim 13, wherein each of the left sibling and the right sibling has exactly two time slots for receiving the particular packet and has two time slots for sending the particular packet.

16. The method of 13, wherein the network is a deterministic wireless network with all time slots allocated to the edge node to send to the third node scheduled after all time slots for the edge node to receive the particular packet.

17. An Available Routing Construct (ARC) chain topology network, including:
a plurality of network nodes organized into a plurality of arcs of the ARC chain topology network, with each of the plurality of network nodes being a physical device including a processor, memory and an network interface, with each of the plurality of arcs having two edge nodes and one or more non-edge nodes, and with the ARC chain topology network configured to progressively forward a packet through different arcs of the plurality of arcs including for each current arc of the plurality of arcs: communicating the packet along the current arc to each of said edge nodes of the current arc and then from each of said edge nodes of the current arc to nodes of a next current arc of the plurality of arcs towards a destination of the packet;
wherein the plurality of arcs includes a first arc consisting of two first edge nodes and including one or more first non-edge nodes, and a second arc consisting of two second edge nodes and including one or more second non-edge nodes;
wherein the ARC chain topology network is a deterministic wireless network with pre-assigned time slots for receiving and subsequently sending a particular packet by each node of said first and second edge and non-edge nodes, wherein the particular packet is the same packet for each node of said first and second edge and non-edge nodes.

18. The ARC chain topology network of claim 17, wherein each particular non-edge node of said first and second non-edge nodes is configured to send the particular packet only to each sibling from which it previously did not receive the particular packet.

19. The ARC chain topology network of claim 17, wherein each particular non-edge node of said first and second non-edge nodes is configured not to send the particular packet to either of its sibling if it was previously received from both of its said siblings.

20. The ARC chain topology network of claim 17, wherein each of said first edge nodes is configured to send the particular packet to a node on the second arc after all of its time slots have expired for receiving the particular packet.

* * * * *